No. 768,933. PATENTED AUG. 30, 1904.
H. DIXON.
BRAKE MECHANISM FOR VEHICLES.
APPLICATION FILED JULY 23, 1903.
NO MODEL.
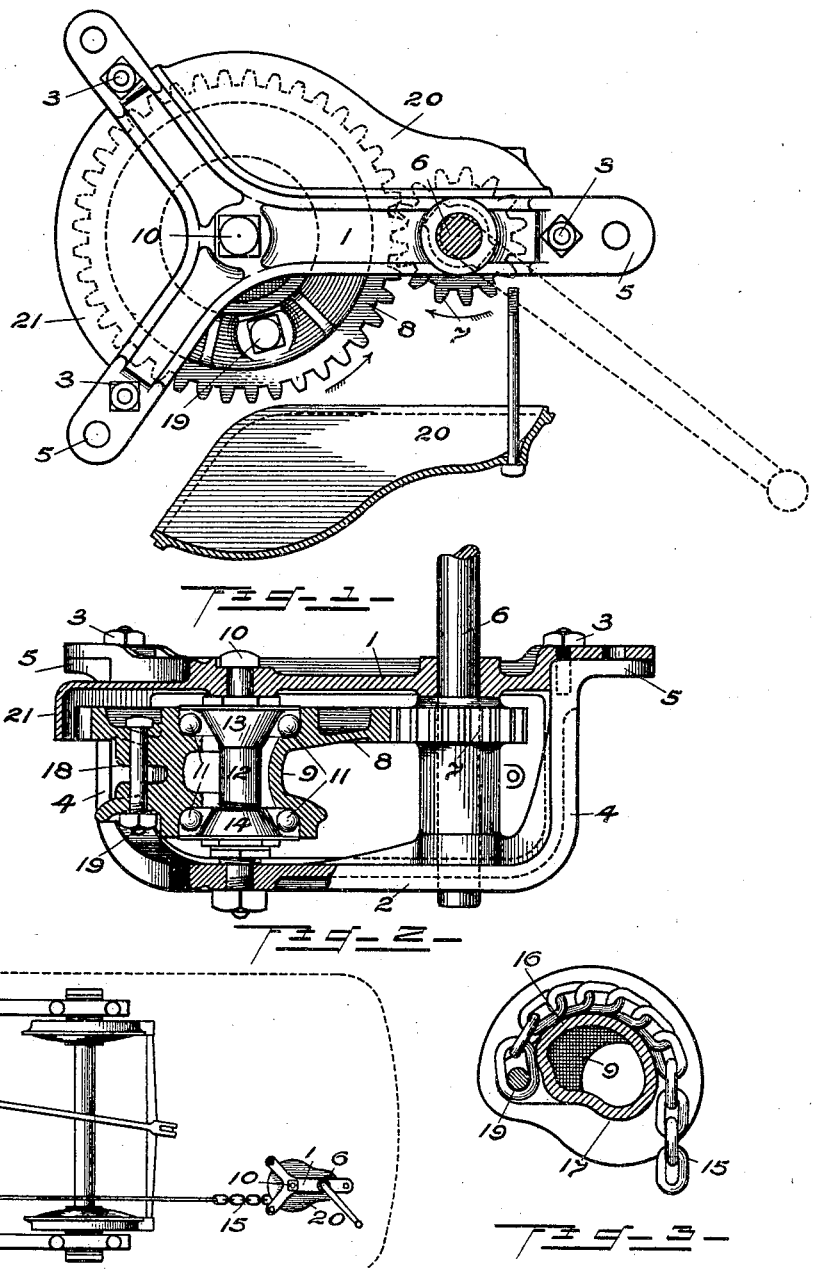
WITNESSES
Stanley J. Palmer
Leonard Foulds
INVENTOR
H. Dixon,
By A. Dixon
Atty.

No. 768,933.

Patented August 30, 1904.

UNITED STATES PATENT OFFICE.

HARRY DIXON, OF TORONTO, CANADA, ASSIGNOR, BY DIRECT AND MESNE ASSIGNMENTS, TO GRIFFIN S. ACKLEY, OF BUFFALO, NEW YORK, AND OBADIAH S. MILLS, OF TUNKHANNOCK, PENNSYLVANIA.

BRAKE MECHANISM FOR VEHICLES.

SPECIFICATION forming part of Letters Patent No. 768,933, dated August 30, 1904.

Original application filed February 19, 1903, Serial No. 144,164. Divided and this application filed July 23, 1903. Serial No. 166,775. (No model.)

*To all whom it may concern:*

Be it known that I, HARRY DIXON, of the city of Toronto, in the county of York and Province of Ontario, Canada, have invented certain new and useful Improvements in Brake Mechanisms for Vehicles; and I do hereby declare that the following is a full, clear, and exact description thereof, reference being had to the accompanying drawings, which form part of this specification.

The present invention is a division of my application, Serial No. 144,164, filed February 19, 1903, and relates particularly to that class of brake-operating mechanism for vehicles in which the operative elements give an increase of leverage relatively proportionate to the applied braking force and more equally distributing the total output of energy expended by the motorman or operator during the rotation of the brake post or spindle, making more efficient the hand-brake. It is general in its application, and particularly a valuable adjunct to the present hand braking mechanism of electrically-propelled or trolley cars.

The characteristic features of the present invention are to embody in a compensating device means to take up rapidly the lost motion of the brake mechanism of the car with a minimum angular movement of the brake-handle, to utilize with advantage the saving thus made, to more effectually apply with a gradually-increasing force the brake-shoe to the wheels by a relatively proportionate increase of the angular movement of the brake-handle, and to maintain a maximum braking force for a considerable degree of the major portion of the said angular movement of the brake-handle. The augmented braking force is sufficient to cause cessation of movement in a comparatively short distance with a minimum expenditure of energy by the operator and to dispense with the objectionable feature of additional turns of the brake-handle over and above that found practical for rapid braking of cars. Appliances have been devised with a similar object in view; but the means employed to make more perfect the hand-brake have in many instances demonstrated the impracticability of their mechanism for rapid and continuous braking of cars. It must be borne in mind that perfection in a brake device permits of a variation in the length of chain or cable wound upon the drum in operating the brakes without curtailing the advantages derived from the increased leverage relatively proportionate to the applied braking force. Owing to the constant wearing away of the brake-shoes and the intermittent variation of the mechanism due to climatic changes the length of chain wound upon the drum varies materially in maintaining a uniform braking force.

The invention consists, in part, of the application of antifriction-bearings to reduce the friction of the primal operating element to a minimum, of the detachable casing to protect the mechanism against injury, dust, &c., and of the manner in which the brake chain or cable is made fast to the drum.

To such ends the invention consists in the construction and combination of parts hereinafter particularly described and claimed, reference being had to the accompanying drawings, forming part thereof, in which similar figures of reference refer to like parts throughout.

Figure 1 is a top plan view of the improved brake-operating mechanism with a portion of the casing removed to more clearly show the operating elements. Fig. 2 is a longitudinal sectional view of Fig. 1, showing the adaptation of ball-bearings to the primal operating element. Fig. 3 is a central horizontal sectional view of the brake-chain drum, showing the integral eccentric and concentric periphery; and Fig. 4 is a plan view showing diagrammatically the manner of applying the brake-operating mechanism.

The actuating elements of the brake-operating device are carried in a substantial frame and inclosed by a casing and located under the platform adjacent to the present brake-post for convenience in operation by the motorman or brakeman. The present brake-post or spindle and its appurtenances can be employed with but few changes and serve as the actuating medium for the improved brake-operating device. The construction and design are liberal throughout, rigidity being an essential feature, as will be readily understood by those versed in the construction of car mechanism. The frame for convenience and to facilitate in assembling of the actuating elements consists of an upper and lower portion 1 and 2, respectively, lying parallel of one another and secured together by studs and nuts 3. To give ample clearance for the operation of the brake-chain and permit of access to the mechanism after removing the casing, a skeleton frame is employed the contour of which resembles that of the letter "Y." The extremities of the upper portion 1 and the lateral terminations of the uprights 4 of the lower portion 2 of the frame are similar and in juxtaposition, forming the lugs 5, by which the device is supported and secured by bolts to the under side of the platform. The lower extremity of the brake-post 6 passes downward through the upper and lower portions 1 and 2, respectively, of the frame and serves as the spindle for the pinion 7, carried fast thereon by a key or feather, preferably the latter, permitting the withdrawal readily of the brake-post 6. Pivoted between the upper and lower portions of the frame and meshing with the aforesaid pinion 7 there is a spur-gear 8, integral with the brake-chain drum 9. The ratio of the spur-gear 8 and pinion 7 is relatively proportionate to the diameter of the drum 9 and the length of chain to be wound thereon and is found preferable to range between two to one and three to one. In alinement with and parallel of the spindle 6 is a vertically-disposed stud or stud-bolt 10, terminally fixed in the upper and lower portions of the frame, and to guard against displacement of the stud-bolt 10 through the loss of the nut the head is on the upper side of the frame and locked by a shoulder projecting from the boss, as shown.

By the adaptation of ball-bearings to the present device, particularly the primal operating element—that is, the brake-chain drum 9—the friction is reduced to a minimum when operating under a heavy strain. In this instance balls having a large diameter are employed, and ball-races 11, correspondingly large for their reception, are formed in the hub and flange of the spur-gear 8 and drum 9, respectively. Carried fixedly upon the stud-bolt 10 and of sufficient length to be gripped between the inner faces of the frame is the sleeve 12, integral with the upper cone 13 and adjustable with the lower cone 14, said lower cone provided with an adjusting-nut and lock-nut, as shown. This arrangement will permit of removing and replacing of the aforesaid brake-chain drum and integral gear without disturbing the adjustment of the bearing.

It is apparent from the foregoing that although advantageous the adaptation of ball-bearings is not an indispensable feature of this invention. Roller-bearings may be substituted or plain bearings should the circumstances warrant such.

By referring to Fig. 3 it will be seen that that portion of the drum 9 upon which the brake-chain 15 is wound has an irregular contour comprising an integral eccentric and concentric periphery 16 and 17, respectively. Commencing at the greatest radius of the drum, at which point the chain is made fast, the slack of the brake-chain is taken up rapidly, gradually diminishing with an increasing purchase by the major portion 16 of the drum, the maximum leverage being reached in a half-revolution of the drum, the position shown in Fig. 3. The minor or concentric portion 17 of the drum remains to take up any additional chain without increasing the turning moment per unit length of chain, which is a desideratum, in part the advantages alluded to in the preamble of this specification. The manner of attaching the brake-chain to the drum is a novel feature of this invention, and the means employed are simple and efficient, permitting readily the attaching and detaching of the chain. In the central portion of the periphery and at the greatest radius of the drum is formed a pocket or recess 18 to receive the terminal link of the brake-chain 15, through which passes the bolt 19, as shown.

Inclosing the greater portion of the mechanism is a detachable casing 20 and a shield 21, integral with the upper portion of the frame, the remaining uninclosed portion accommodating the operation of the brake-chain. The manner of securing the detachable casing is unimportant. Any well-known means may be employed.

Having described my invention, what I claim is—

1. In a brake-actuating mechanism, the combination with the brake-post and pinion on the lower end of said post, of a brake-actuating drum comprising an integral eccentric and concentric periphery, a gear in mesh with said pinion and operating said drum, and a brake-chain attached to said drum and adapted to operate with a variable leverage, substantially as set forth.

2. In a brake-actuating mechanism, the combination with the brake-post, of a pinion on the lower end of said post, a gear in mesh with said pinion, and a brake-chain drum having a periphery eccentric and concentric to said gear, substantially as and for the purpose set forth.

3. In a brake-actuating mechanism, the combination with the brake-actuating drum and gear, of an integral eccentric and concentric periphery, a brake-chain attached to said drum and adapted to operate with a variable leverage, and a pinion in mesh with said gear and actuated by the brake-post, substantially as and for the purpose set forth.

4. In a brake-actuating mechanism the combination with the brake-actuating drum and gear, of a recess formed in the periphery of said drum and adapted to receive the terminal link of the brake-chain, and a bolt adapted to pass through said link and integral with said drum, substantially as shown and for the purpose set forth.

5. In a brake-actuating mechanism, the combination with ball-bearings, of a brake-actuating drum and gear, the hub of said drum adapted for the reception of said bearings and upper and lower cones interspaced by the balls, a sleeve integral with one of said cones and adjustable with the other, and means for adjusting said cones, substantially as and for the purpose set forth.

6. In a brake-actuating mechanism, the combination with a frame comprising upper and lower portions adapted to meet at their extremities, and having three bearing-supports forming lateral lugs for securing said frame to the platform of the car, of a brake-post journaled in said frame, a pinion on the lower end of said post and interspacing said frame, a vertically-disposed stud carrying a gear in mesh with said pinion, a brake-actuating drum having a periphery eccentric and concentric with said gear integral with said drum, and a brake-chain attached to said drum and adapted to operate with a variable leverage, substantially as and for the purpose set forth.

In witness whereof I have hereunto set my hand in presence of two witnesses.

HARRY DIXON.

Witnesses:
STANLEY J. PALMER,
E. N. DIXON.